United States Patent [19]
Chisaka

[11] Patent Number: 5,623,655
[45] Date of Patent: Apr. 22, 1997

[54] DATA PROCESSING SYSTEM THAT MANAGES SHARED DOCUMENTS

[75] Inventor: Toshiyuki Chisaka, Kawasaki, Japan

[73] Assignee: Fujitsu Limited, Japan

[21] Appl. No.: 326,489

[22] Filed: Oct. 20, 1994

[30] Foreign Application Priority Data

Feb. 24, 1994 [JP] Japan .................................. 6-026835

[51] Int. Cl.$^6$ .................................................. G06F 17/30
[52] U.S. Cl. ................................. 395/608; 364/DIG. 1; 364/282.4
[58] Field of Search ............................................. 395/600

[56] References Cited

U.S. PATENT DOCUMENTS 5,537,526   7/1996   Anderson et al. ....................... 395/148

OTHER PUBLICATIONS

Wiil, "Issues in the Design of EHTS: A Multiuser Hypertext System for Collaboration", PROC of the Twenty–Fifth Hawaii International Conference on System Sciences, pp. 629–639 vol. 2, 7–10 Jan. 1992.

Ng et al, "A Distributed Multimedia Conferencing System", PROC of the TENCON '93 IEEE Region 10 Conference on 'Computer, Communication, Control and Power Engineering, 19–21 Oct. 1993, pp. 57–60.

Primary Examiner—Wayne Amsbury
Attorney, Agent, or Firm—Greer, Burns & Crain, Ltd.

[57] ABSTRACT

A data processing system for storing and managing at least one shared document in a storage unit, includes a memory unit for storing first information that indicates update levels comparable to frequencies of access to shared documents in one-to-one correspondence with users, and a control unit for controlling access to the memory and storage and management of the shared documents. The control unit includes a unit that when a first user accesses any of the shared documents so as to update it, retrieves a latest update level of the shared document accessed from the first information and determines on the basis of the result of retrieval whether there is a second user who has accessed the shared document before the first user, and a unit that when the result of determination reveals that there is a second user, notifies the second user of the fact that the shared document has been updated by the first user. This configuration enables users to acquire latest correct information concerning shared documents all the time, and eventually improves the users' convenience in utilizing the shared documents.

5 Claims, 4 Drawing Sheets

DATA PROCESSING SYSTEM THAT MANAGES SHARED DOCUMENTS

BACKGROUND OF THE INVENTION

1. Field of the Invention

The present invention relates to an art of managing shared documents. More particularly, this invention relates to a data processing system for storing shared documents in a storage unit using a local area network (LAN) such as a group ware and for managing them.

2. Description of the Related Art

In the past, a data processing system for managing shared documents using a LAN is focused on controlling a process that when a plurality of users contend with one another about access to one shared document, grants an access authority to a single user, or on controlling a process that when one user is granted an access authority, suspends temporarily access authorities of other users or excludes the access authorities.

In such a document sharing-related art, when a certain user had gained an access authority, referred to a shared document, and updated the shared document, the fact that the shared document has been updated should be notified together with the contents of update, if necessary, for the sake of users' (including users who have previously accessed to (referred to/updated) the shared document) convenience. In this case, the user who has updated the shared document should autonomously notify other uses who have accessed the shared document previously of the fact.

According to the aforesaid prior art, as long as users merely refer to a shared document, no problem occurs. However, when a user who has referred to a shared document is different from a user who has updated the shared document, a problem described below occurs.

For example, after a certain person (a first user) has referred to a shared document, another person (a second user) updates the shared document. In this case, when accessing the shared document again for the purpose of updating, the first user may proceed with work using previous information (or information that has not been updated) while being unconscious or unaware of the fact that the shared document has previously been updated.

When a user has updated a shared document, there is no problem as long as the user can notify other users of the fact using mail messages or the like. According to the conventionally known art, since a user who has updated a shared document does not have means for accurately finding out which users have accessed the shared document previously, the user cannot notify other users of the fact that the shared document has been updated. Consequently, as mentioned above, a user who has accessed the shared document may proceed with work using information that has not been updated (incorrect information). This is because even if the shared document has been updated, the user may be unaware of the fact.

As mentioned above, in the conventionally known art related to document sharing, no consideration is taken into means for automatically notifying other users of the fact that a shared document has been updated. Users cannot therefore acquire the latest correct information concerning a shared document. This brings about an incident that the shared document is updated according to incorrect information. Eventually, the users are put to inconvenience in utilizing the shared document. This is not preferable.

SUMMARY OF THE INVENTION

An object of the present invention is to provide a data processing system enabling users to acquire latest correct information concerning a shared document all the time and eventually improving the users' convenience in utilizing the shared document.

According to the present invention, there is provided a data processing system for storing and managing at least one shared document in a storage unit. The data processing system comprises: a memory means for storing first information that indicates update levels comparable to frequencies of access to shared documents in one-to-one correspondence with users; and a control means for controlling access to the memory means and storage and management of the shared documents.

The control means includes: a means that when a first user accesses any of the shared documents so as to update it, retrieves a latest update level of the shared document accessed from the first information and determines on the basis of the result of the retrieval whether there is a second user who has accessed the shared document before the first user; and a means that when the result of the determination reveals that there is a second user, notifies the second user of the fact that the shared document has been updated by the first user.

BRIEF DESCRIPTION OF THE DRAWINGS

Other objects and features of the present invention will be described hereinafter in detail in conjunction with preferred embodiments with reference to the accompanying drawings, in which.

DESCRIPTION OF THE PREFERRED EMBODIMENTS

Figure 1:
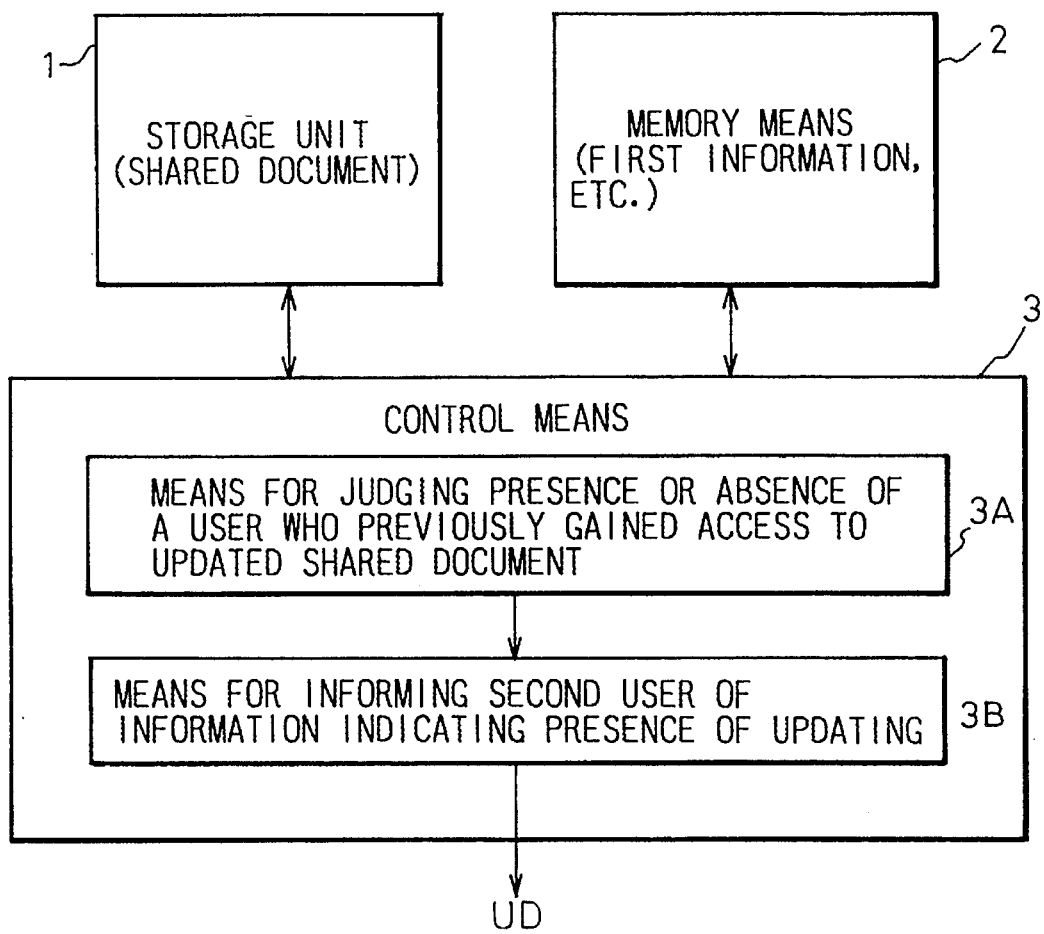
FIG. 1 is a block diagram showing a principle and configuration of a data processing system for managing shared documents in accordance with the present invention.

FIG. 1 shows a principle and configuration of a data processing system for managing shared documents in accordance with the present invention.

In a data processing system shown in FIG. 1, reference numeral 1 denotes a storage unit for storing and managing at least one shared document. 2 denotes a memory means for storing first information indicating update levels comparable to frequencies of access to shared documents in one-to-one correspondence with users. 3 denotes a control means for controlling access to the memory means 2 and storage and management of the shared documents. The control means 3 includes means 3A that when a first user accesses any of the shared documents so as to update it, retrieves a latest update level of the shared document accessed from the first information and determines on the basis of the result of retrieval whether there is a second user who has accessed the shared document before the first user, and means 3B that when the result of determination reveals that there is a second user, notifies the second user of information UD indicating that the first user has updated the shared document.

In a preferred embodiment of the present invention, as described later, the control means 3 further includes means that when the first user updates a shared document accessed by the second user, compares the shared document that has not been updated with the one that has been updated, and produces information indicating the contents of update. The information indicating the contents of update is posted to the second user together with the information UD indicating the fact that the shared document has been updated.

According to the foregoing configuration in accordance with the present invention, when the first user accesses to any shared document so as to update it, the control means 3 (3A) determines whether there is a second user who has accessed the shared document before the first user. When the result of determination reveals that there is a second user, the control means 3 (3B) notifies the second user of the fact (information UD) that the shared document has been updated by the first user.

On receipt of the information UD, the second user becomes aware of the latest correct information concerning the shared document. When a user accesses the shared document again for the purpose of updating, the user is unsusceptible to a drawback lying in a prior art (that is, a user proceeds with work using incorrect information that has not been updated).

By including a means that when a shared document is updated, produces information indicating the contents of update, the information indicating the contents of update can be posted together with the information UD indicating the fact that the shared document has been updated. This further improves the users' convenience in utilizing shared documents.

Figure 2:
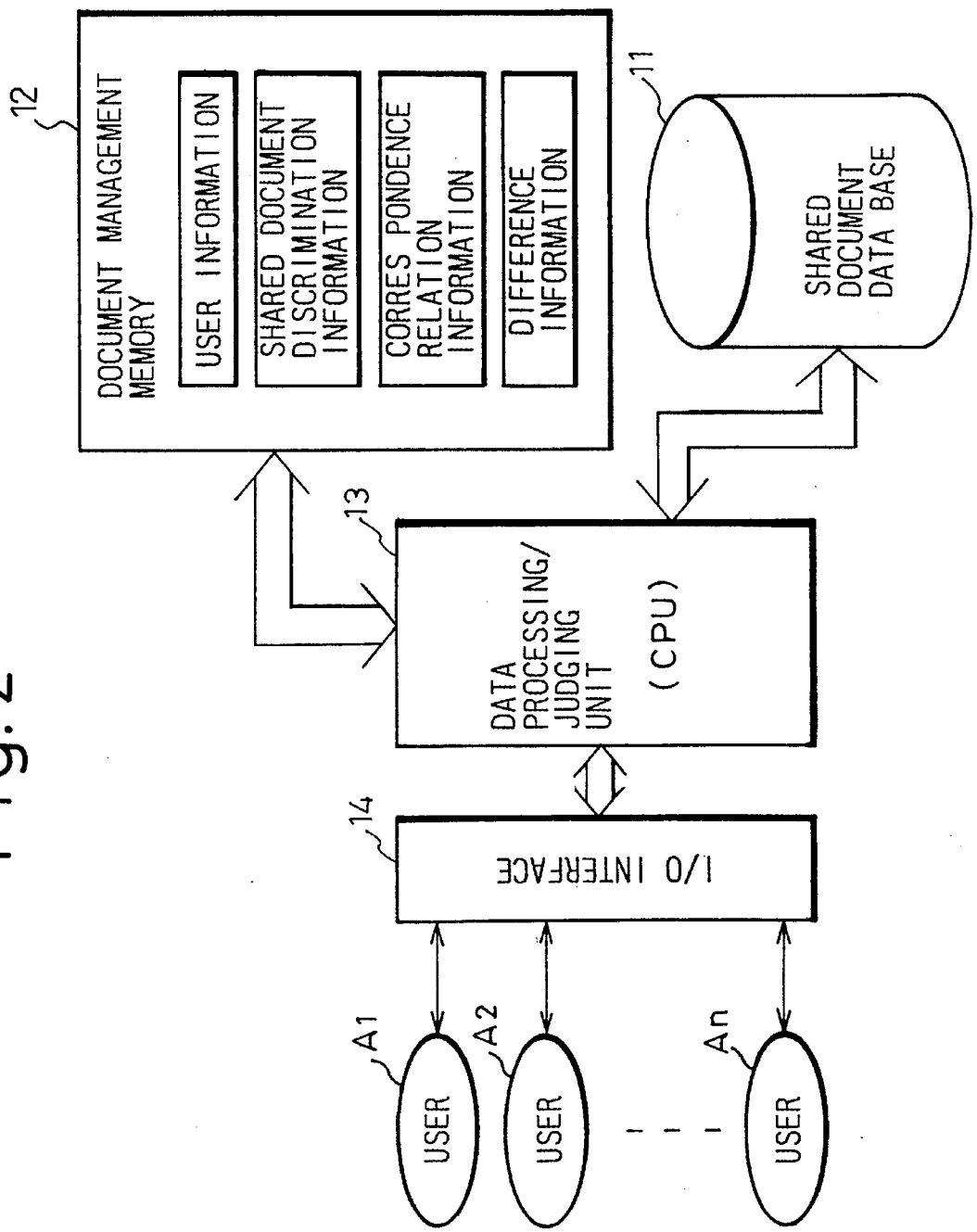
FIG. 2 is a block diagram showing a configuration of a data processing system in accordance with an embodiment of the present invention.

FIG. 2 shows a configuration of a data processing system in accordance with an embodiment of the present invention.

In FIG. 2, reference numeral 11 denotes a database composed of shared documents and formed with a large-capacity memory such as a magnetic disk. The database 11 stores and manages a plurality of shared documents arbitrarily accessible by users $A_1$ to $A_n$. The database 11 corresponds to the storage unit 1 in FIG. 1. The users $A_1$ to $A_n$ have been registered in the data processing system that performs shared document management. 12 denotes a memory designed for document management and formed with a rewritable RAM or the like. The document management memory 12 corresponds to the memory means 12 in FIG. 1.

Stored in the document management memory 12 are user information identifying the users $A_1$ to $A_n$, shared document discrimination information specifying shared documents, correspondence information indicating update levels of the shared documents accessed by the users $A_1$ to $A_n$ (that is, level information comparable to frequencies of access to the shared documents) in one-to-one correspondence with the users, and difference information (to be described later).

Reference numeral 13 denotes a data processing/judging unit that is a central processing unit (CPU). The data processing/judging unit 13 corresponds to the control means 3 in FIG. 1. 14 denotes an input/output (I/O) interface through which shared document data, access data, or the like is transferred between the data processing/judging unit 13 and the users $A_1$ to $A_n$. The data processing/judging unit 13 controls transfer of shared document data to or from the shared document database 11, access to the document management memory 12, and communications among the users $A_1$ to $A_n$ via the I/O interface 14.

Next, shared document management to be executed by the data processing/judging unit 13 will be described with reference to the flowchart shown in FIGS. 3a and 3b.

Figure 3A:
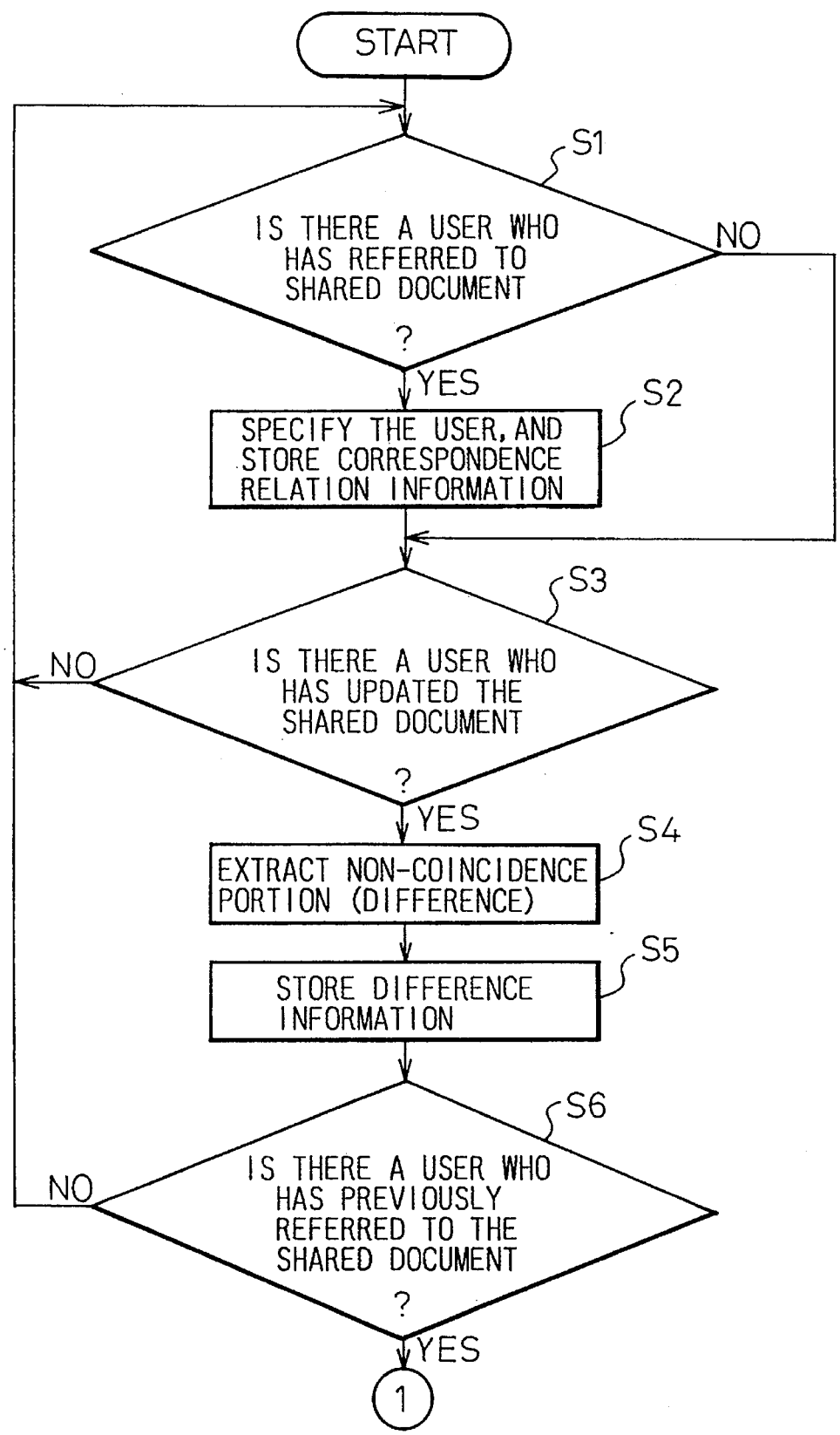
FIGS. 3a and 3b are flowcharts representing shared document management to be executed by the data processing/judging unit shown in FIG. 2.
Figure 3B:
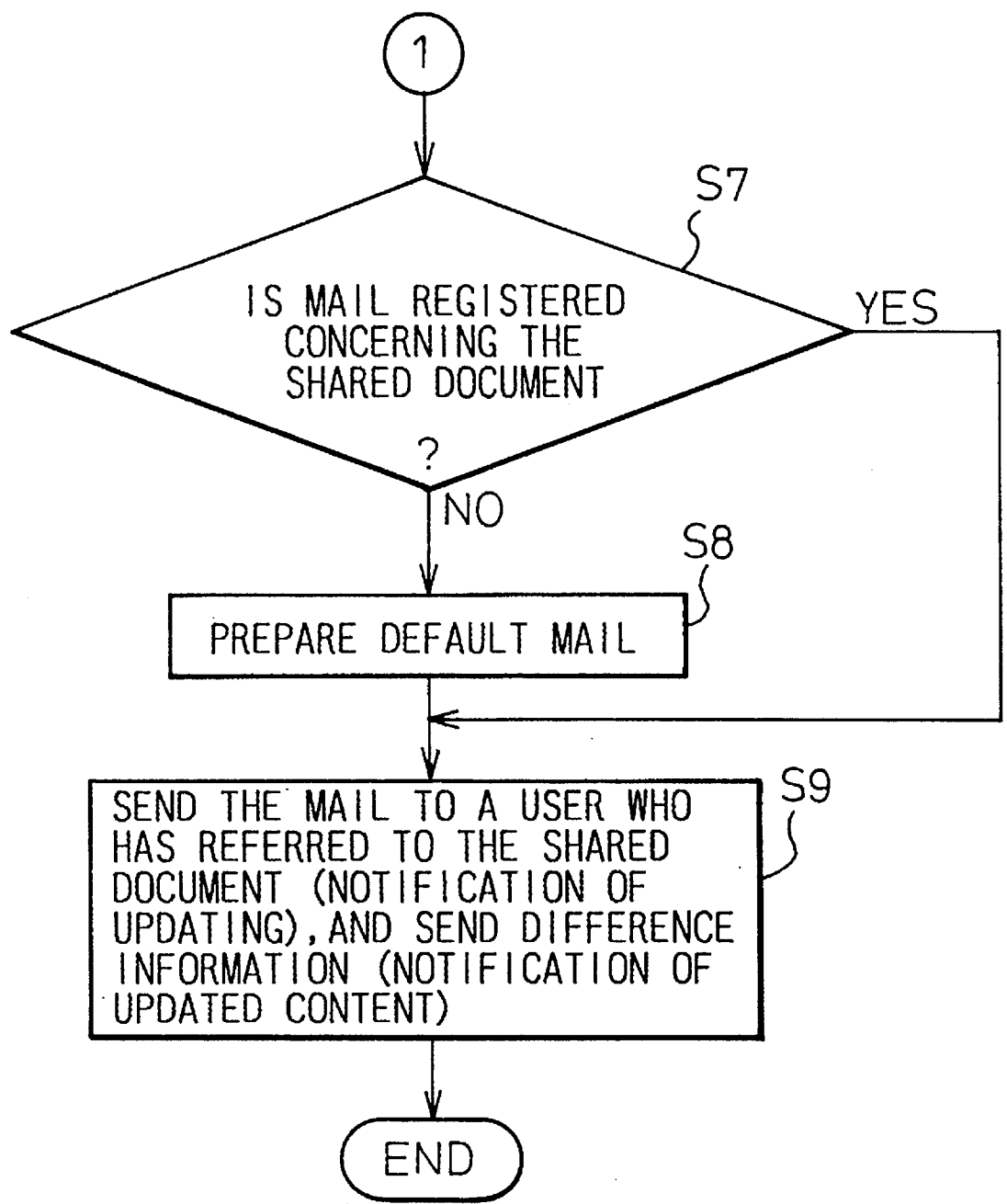

In FIGS. 3a and 3b, for simplification, access (for reference or update) is gained to only one shared document. It is understood that each processing step in the flowchart is succeeded or preceded by a step of specifying or determining a shared document to which access is gained.

First, at step S1, it is determined whether any user has referred to a shared document. If the result of determination is in the affirmative, control is passed to step S2. If the result of determination is in the negative, control is passed to step S3. At step S2, user information is retrieved from the document management memory 12. A user who has referred to the shared document is identified. Information indicating the shared document in correspondence with the identified user is then stored as correspondence information in the document management memory 12. Control is then passed to step S3.

At step S3, it is determined whether any user has updated the shared document. If the result of determination is in the affirmative, control is passed to step S4. If the result of determination is in the negative, control is returned to step S1. At step S4, the shared document that has been updated are compared with the one that has not been updated, and then an inconsistent portion (that is, a difference) is extracted. At step S5, information (difference information) concerning the extracted inconsistent portion is temporarily stored in the document management memory 12.

At step S6, it is determined whether any user has referred to the shared document. If the result of determination is in the affirmative, control is passed to step S7. If the result of determination is in the negative, control is returned to step S1. At step S7, it is determined whether a mail addressed to the shared document has been registered. If the result of determination is in the negative, control is passed to step S8. If the result of determination is in the affirmative, control is passed to step S9. At step S8, a default mail is prepared. Control is then passed to step S9.

At step S9, the mail is automatically sent to all users who have referred to the shared document (thus reporting that the shared document has been updated). At the same time, the difference information that was stored in the document management memory 12 at step S5 is appended to the mail and sent out (contents of update are posted). This sequence then comes to an end.

In this embodiment, the processing of steps S4 and S5 is executed after step S3. Processing steps need not be sequenced in the aforesaid order. As apparent from the flowchart illustrated, the processing of steps S4 and S5 may be preceded or succeeded by any other processing as long as it is executed after the processing of step S3 but before at least posting of the contents of update of step S9.

As described so far, according to the data processing system for managing shared documents in accordance with this embodiment, when any shared document is updated, the data processing/judging unit 13 retrieves correspondence information from the document management memory 12 so as to identify users who have accessed to (referred to) the shared document previously. A mail message is then automatically sent to the identified users in order to notify the users of the fact that the shared document has been updated. At the same time, the contents of update can be posted.

On receipt of the notification saying that the shared document has been updated and of the contents of update, the users become aware of the latest information concerning the shared document. This resolves a drawback lying in a prior art that when a user accesses to the shared document again for the purpose of updating, the user may proceed with work using incorrect information that has not been updated. At the same time, users' convenience in utilizing shared documents further improves.

In this embodiment, the database 11 for storing shared documents is installed separately from the document management memory 12. If the database 11 has a sufficient storage capacity, information to be stored in the memory 12 may be stored in a storage area in the database 11 and the memory 12 may not be used.

When the data processing/judging unit 13 is provided with a facility for registering prototypes of mails in shared documents, the present invention is expected to yield a variety of applications such as reporting to people concerned including users of the system.

Although the present invention has been disclosed and described in conjunction with one embodiment, it will be apparent to those skilled in the art that other embodiments and modifications of the present invention are possible without departing from the essential features thereof.

What is claimed is:

1. A data processing system for storing and managing at least one shared document in a storage unit, comprising:

memory means for storing first information that indicates update levels comparable to frequencies of access to shared documents in one-to-one correspondence with users; and control means for controlling access to said memory means and storage and management of said shared documents, and control means including, means for retrieving a latest update level of said shared document accessed from said first information when a first user accesses any of said shared documents so as to update it and for determining, on the basis of the result of said retrieval, whether there is a second user who has accessed said shared document before said first user; and means for notifying said second user of the fact that said shared document has been updated by said first user when the result of said determination reveals that there is a second user.

2. The data processing system according to claim 1, wherein said control means further comprises means for updating information concerning said second user according to said first information after said information indicating that said shared document has been updated is posted to said second user.

3. The data processing system according to claim 1, wherein said control means further comprises means for comparing said shared document that has been updated with said shared document that has not been updated when said first user updates a shared document accessed by said second user, and for producing information indicating the contents of update, and said control means notifies said second user of said information indicating said contents of update together with said information indicating that said shared document has been updated.

4. The data processing system according to claim 3, wherein said information indicating that said shared document has been updated and said information indicating said contents of update are posted using mail.

5. The data processing system according to claim 1, wherein said memory means stores second information specifying shared documents and third information identifying users, and said first information is produced according to said second and third information.

\* \* \* \* \*